United States Patent
Krajnc et al.

(10) Patent No.: US 12,360,200 B2
(45) Date of Patent: Jul. 15, 2025

(54) RECEIVER FOR A RADIOFREQUENCY-BASED RF PRESENCE-SENSING ARRANGEMENT

(71) Applicant: SIGNIFY HOLDING B.V., Eindhoven (NL)

(72) Inventors: Hugo Jose Krajnc, Eindhoven (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 553 days.

(21) Appl. No.: 17/609,586

(22) PCT Filed: May 12, 2020

(86) PCT No.: PCT/EP2020/063117
§ 371 (c)(1),
(2) Date: Nov. 8, 2021

(87) PCT Pub. No.: WO2020/229441
PCT Pub. Date: Nov. 19, 2020

(65) Prior Publication Data
US 2022/0229150 A1 Jul. 21, 2022

Related U.S. Application Data

(60) Provisional application No. 62/847,550, filed on May 14, 2019.

(30) Foreign Application Priority Data

Jun. 12, 2019 (EP) ..................................... 19179705

(51) Int. Cl.
G01S 7/00 (2006.01)
G01S 13/00 (2006.01)
G01S 13/04 (2006.01)

(52) U.S. Cl.
CPC ............ *G01S 7/006* (2013.01); *G01S 13/003* (2013.01); *G01S 13/04* (2013.01)

(58) Field of Classification Search
CPC ......... G01S 7/006; G01S 13/003; G01S 13/04
See application file for complete search history.

(56) References Cited

U.S. PATENT DOCUMENTS 6,484,176 B1 * 11/2002 Sealand ................. G06Q 50/16
7,890,060 B2    2/2011 Lehtinen
(Continued)

FOREIGN PATENT DOCUMENTS

| CN | 103609137 A | * | 2/2014 | ............ G01S 11/06 |
| CN | 107799882 A | * | 3/2018 | ............ G01S 7/006 |

(Continued)

*Primary Examiner* — Vladimir Magloire
*Assistant Examiner* — Maxine McKenzie Phillips

(57) ABSTRACT

The invention is directed to a receiver (100) for an RF presence-sensing arrangement (150). The receiver is configured to receive a first intra-network RF sensing signal (102) from a first transmitter (104), both pertaining to a first local-area RF communication network (106) spanning a first presence-sensing volume (114) and to additionally receive an inter-network RF sensing signal (108) from a second transmitter (110) pertaining to a second local-area RF communication network (112), thus spanning a third presence-sensing volume (120) and to provide a first and an inter-network signal-strength signal ($S_1$, $S_3$) indicative of a respective received-signal strength. In the RF presence-sensing arrangement, a presence detection unit (122) is configured to provide, based on the signal-strength signals, a presence detection signal ($S_{DET}$) indicative of a change in presence of a subject or object in the first or in the third presence-sensing volume, thus increasing the accuracy of the presence determination.

19 Claims, 4 Drawing Sheets

(56) References Cited

U.S. PATENT DOCUMENTS

| | | |
|---|---|---|
| 9,474,042 B1 | 10/2016 | Wootton et al. |
| 10,410,511 B2 | 9/2019 | Mackenzie et al. |
| 2008/0042824 A1 | 2/2008 | Kates |
| 2008/0102756 A1* | 5/2008 | Lehtinen .................. G01S 5/00 455/67.11 |
| 2011/0050319 A1* | 3/2011 | Wong ..................... H03D 7/165 327/356 |
| 2012/0146788 A1* | 6/2012 | Wilson ................. G08B 13/187 340/539.23 |
| 2013/0035109 A1* | 2/2013 | Tsruya ................ G01S 5/02526 455/456.1 |
| 2013/0181834 A1 | 7/2013 | Bentley et al. |
| 2013/0281111 A1 | 10/2013 | Syrjarinne et al. |
| 2015/0172873 A1 | 6/2015 | Shin et al. |
| 2015/0249907 A1 | 9/2015 | Gupta et al. |
| 2015/0331093 A1 | 11/2015 | Pandharipande et al. |
| 2018/0146334 A1 | 5/2018 | Wootton et al. |
| 2019/0320515 A1* | 10/2019 | Sadwick ................ H05B 45/00 |

FOREIGN PATENT DOCUMENTS

| | | | |
|---|---|---|---|
| WO | 2010003408 A1 | 1/2010 | |
| WO | WO-2017125255 A1 * | 7/2017 | ......... H04L 41/0803 |
| WO | WO-2018001762 A1 * | 1/2018 | ........... H04B 10/116 |
| WO | WO-2019032718 A1 * | 2/2019 | ........... G01S 5/0278 |

* cited by examiner

RECEIVER FOR A RADIOFREQUENCY-BASED RF PRESENCE-SENSING ARRANGEMENT

CROSS-REFERENCE TO PRIOR APPLICATIONS

This application is the U.S. National Phase application under 35 U.S.C. § 371 of International Application No. PCT/EP2020/063117, filed on May 12, 2020, which claims the benefits of European Patent Application No. 19179705.9, filed on Jun. 12, 2019 and U.S. Patent Application No. 62/847,550, filed on May 14, 2019. These applications are hereby incorporated by reference herein.

FIELD OF THE INVENTION

The present invention is directed to a receiver for a radiofrequency (RF) presence-sensing arrangement, to an RF transceiver for an RF presence-sensing arrangement, to a method for operating an RF transceiver in an RF presence-sensing arrangement, to a method for operating an RF presence-sensing arrangement, and to computer programs for implementing the methods.

BACKGROUND OF THE INVENTION

Radiofrequency presence sensing is a presence sensing mechanism that infers presence of subjects (humans) or objects in a given presence-sensing volume based on how RF sensing signals are affected by a presence or motion of the subject or object within the presence-sensing volume.

U.S. Pat. No. 9,474,042 B1 describes RF presence-sensing arrangements and methods for detecting the presence of a body using signal absorption and signal forward and reflected backscatter of RF sensing signals caused by the presence of a biological mass.

US 2012/146788 A1 discloses method for device-free motion detection and presence detection within an area of interest. A plurality of nodes, configured to be arranged around the area of interest, form a wireless network, and arranged for transmitting and receiving wireless signal. A computing device receives reported values for the measured RSS for the received wireless signal and tracks the reported values over time. The computing device processes the reported values using an aggregate disturbance calculation to detect motion and presence within the area of interest.

SUMMARY OF THE INVENTION

It would be desirable to provide an RF presence-sensing arrangement, an RF transceiver for an RF presence-sensing arrangement, a receiver for use in such an RF transceiver, and corresponding methods and computer programs, which allow achieving a particularly low hardware expenditure in an RF presence-sensing arrangement.

The present invention encompasses different aspects, which in particular comprise device aspects and method aspects. In the following, the different device aspects of the present invention will be described, before turning to various embodiments of these different device aspects. Subsequently, the different method aspects of the present invention will be described, followed by a description of the computer program aspects of the present invention.

Turning to the device aspects, a first aspect of the present invention is formed by an RF presence-sensing arrangement. The RF presence-sensing arrangement comprises:

a first set of RF transceivers that belong to a first local-area RF communication network spanning a first presence-sensing volume, wherein the RF transceivers of the first set are configured to transmit and receive first intra-network RF sensing signals within the first local-area RF communication network;

a second set of RF transceivers that belong to a second local-area RF communication network spanning a second presence-sensing volume different from the first presence-sensing volume, wherein the RF transceivers of the second set are configured to transmit and receive second intra-network RF sensing signals within the second local-area RF communication network; wherein at least one of the RF transceivers of the second set of RF transceivers is further configured to transmit wireless inter-network RF sensing signals for reception by at least one of the RF transceivers of the first set of RF transceivers, and the at least one RF transceiver of the first set is arranged and configured to additionally receive the inter-network RF sensing signal, thus spanning a third presence-sensing volume bridging space between the first presence-sensing volume and the second presence-sensing volume.

The at least one RF transceiver of the first set comprises a receiver with a signal-strength determination unit that is configured to determine a first amount of a quantity indicative of a received-signal strength of the received first intra-network RF sensing signal and to provide a first signal-strength signal indicative thereof. The receiver is additionally configured to determine a second amount of a quantity indicative of a received-signal strength of the received inter-network RF sensing signal and to provide an inter-network signal-strength signal indicative thereof.

The RF presence-sensing arrangement further comprises at least one presence detection unit configured to receive, from the receiver, the first signal-strength signal and the inter-network signal-strength signal, and, using the first signal-strength signal and the inter-network signal-strength signal, to provide a presence detection signal indicative of presence or absence of a subject or object in the first or in the third presence-sensing volume.

The RF presence sensing arrangement of the first aspect is based on the recognition that since the quality, i.e., reliability, latency, repeatability, accuracy, etc. of presence detection depends on the interaction of the human body with RF sensing signals, a directionality of the antennas of RF transceivers in the local-area RF communication network and their placement within a given space plays an important role in RF-based sensing. The detection sensitivity is strongest within the direct line of sight of the RF transceivers of a given local-area RF communication network, but subject to variations of RF design and directionality of antennas. Due to effects of reflection and resulting multipath propagation the presence-sensing volume somewhat extends beyond the line of sight. Still, such a rather limited presence-sensing volume would require distributing a large number of RF transceivers in the local-area RF communication networks to fully cover a sufficiently large desired overall sensing space.

Furthermore, the RF presence sensing arrangement of the first aspect makes use of the further recognition that most RF presence sensing arrangements are based on the use of a plurality of different sets of RF transceivers, each set covering a different sensing volume, for covering a desired overall sensing space.

Making use of these recognition, also the RF presence-sensing arrangement of the first aspect comprises at least two different sets of RF transceivers, each forming part of a respective different local-area RF communication network, which spans a respective presence-sensing volume for presence sensing. Of course, more than two sets of RF transceivers, each set forming part of a respective different local-area RF communication network may be used in the arrangement, depending on the application case.

The first and second presence-sensing volumes spanned by the first and second local-area RF communication networks are different from each other. Thus, the first and second presence-sensing volumes each form a respective volume in space, which may, but typically does not overlap with the other presence-sensing volume. These presence-sensing volumes are spanned by a respective local-area RF communication network of presence-sensing RF transceivers and reach as far as received RF sensing signals transmitted within the respective local-area RF communication network allow determining a presence of a human. For a given pair of two RF transceivers within a local-area RF communication network, a corresponding presence-sensing volume spanned by this pair of RF transceivers has a geometric shape, which is typically similar to an ellipsoid or, in other words, the shape of an American football, with the RF transceivers arranged at the ends of the shape. However, the mentioned shape of such a presence-sensing volume is exemplary only and may vary with the directionality of antennas of a given type of RF transceiver. The presence-sensing volume of a given local-area RF communication network corresponds to a combination of the presence-sensing volumes of the pairs of RF transceivers within that local-area RF communication network. For a given transmitted energy amount of the RF sensing signals, reliability or even possibility of presence sensing typically decreases beyond a certain distance between two RF transceivers under consideration. Thus, depending on a given arrangement of RF transceivers, and in particular of its radiation patterns and on the distribution of objects arranged in a given environment, not all possible pairs of RF transceivers may contribute to the sensing volume.

Such an arrangement of a plurality of local-area RF communication networks covering individual presence-sensing volumes enables presence-sensing in different areas of a space to be monitored, such as for instance different floors or sections in a building.

Advantageously, the sensing arrangement of the first aspect additionally enables a signal communication of inter-network RF sensing signals, i.e., beyond technical and spatial network boundaries defined by the association of RF transceivers to the respective first or second local-area RF communication networks. This way, a third presence-sensing volume bridging space between the first and second presence sensing volumes is created and increases the total sensing volume of the RF presence-sensing arrangement. The present invention improves intra-network presence sensing in extending it by inter-network presence sensing. This additional third presence-sensing volume allows arranging RF transceivers at larger distances to their next neighboring RF transceivers of the same local-area RF communication network, and thus decreases the required hardware expenditure for implementing a given RF presence-sensing arrangement in comparison with known arrangements providing only intra-network RF sensing signals. Of course, the arrangement of those RF transceivers of the first and second local-area RF communication network that receive and transmit the inter-network RF sensing signals is to be chosen with a view to given transmit energy or transmit power requirements applicable for the inter-network RF sensing signals in a given application case, in order to allow a reception of the inter-network RF sensing signals by the at least one RF transceiver, and subsequent RSSI determination Even if in a given RF presence-sensing arrangement the sensing volumes of the first and second local-area RF communication network overlap, the RF presence-sensing arrangement advantageously increases the accuracy of the detection of the presence of a subject or object based on the provision of an additional sensing information for detecting said presence by enabling detection in both the first and the third presence-sensing volume.

For clarification it is pointed out that the presence detection unit is generally configured to provide a presence detection signal that indicates whether or not any subject is present in the first or in the third presence-sensing volume. Certain embodiments, which will be described further below, additionally achieve detecting a change of a number of subjects in the first or in the third presence-sensing volume.

For reasons of simplicity and clarity of the description, the present specification attributes certain functions associated with inter-network presence sensing to the different sets of RF transceivers associated with the first and with the second local-area RF communication network. For instance, the inter-network RF sensing signals are described to be generated and provided by RF transceivers of the second set which form the second local-area RF communication network. However, it should be understood that in this description the roles of the first and second sets of RF transceivers in transmitting and receiving the inter-network RF signals is interchangeable. In fact, in some embodiments both sets of RF transceivers assume both, the receiving role of the RF transceivers of the first local-area RF communication network and the transmitting role of the RF transceivers of the second local-area RF communication networks, so that inter-network RF signals are exchanged both ways between the first and second local-area RF communication networks.

In preferred embodiments, the at least one of the RF transceivers of the first set is an RF transceiver according to the third aspect of the invention, which will be described further below.

In an embodiment of the RF-presence sensing arrangement of the first aspect, the transceivers of the second set of RF transceivers are configured to transmit the wireless inter-network RF sensing signals for reception by at least one of the RF transceivers of the first set of RF transceivers with a controllable signal power amount.

In a preferred embodiment, the RF transceivers of the first and the second set are configured to provide first intra-network RF sensing signals and inter-network RF signals comprising data indicative of an RF-transceiver identifier, suitable for identifying the RF-transceiver that has provided the received first intra-network RF sensing signal or the inter-network RF signal.

As a further device aspect, a second aspect of the present invention is formed by an RF transceiver for an RF presence-sensing arrangement. The RF transceiver is configured to exchange first intra-network RF sensing signals within a first set of RF transceivers that belong to a first local-area RF communication network spanning a first presence-sensing volume. The RF transceiver comprises a receiver for RF sensing signals. The receiver for RF sensing signals comprises an RF signal receiving unit which is configured to receive from a first transmitter a wireless first intra-network RF sensing signal transmitted within a first local-area RF communication network spanning a first presence-sensing volume. The RF signal receiving unit is further configured to receive from a second transmitter that belongs to a second local-area RF communication network, which is different from the first local-area RF communication network and which spans a second presence-sensing volume different from the first presence-sensing volume, an inter-network RF sensing signal, thus spanning a third presence-sensing volume bridging space between the first presence-sensing volume and the second presence-sensing volume. The receiver further comprises a signal-strength determination unit which is configured to determine a first amount of a quantity indicative of a received-signal strength of the received first intra-network RF sensing signal and to provide a first signal-strength signal indicative thereof. Additionally, the signal-strength determination unit is configured to determine a second amount of the quantity indicative of a received-signal strength of the received inter-network RF sensing signal and to provide an inter-network signal-strength signal indicative thereof.

The RF transceiver of the second aspect of the present invention provides functionality required for an RF transceiver to implement an RF presence-sensing arrangement according to the first aspect of the present invention. The transceiver comprises a receiver for RF sensing signals having an RF signal receiving unit, which is not only capable of receiving and processing intra-network RF sensing signals received from one or more first RF transceivers within the first local-area RF communication network to which the RF transceiver belongs but additionally is also capable of receiving and processing the inter-network RF signals provided by one or more second RF transceivers, which do not form a part the first local-area RF communication network defining the first presence-sensing volume, but form a part of a second presence-sensing volume. As such, the RF transceiver of the second aspect of the invention shares the advantages achieved by the RF presence-sensing arrangement of the first aspect.

As a further device aspect, a third aspect of the present invention is formed by a receiver for RF sensing signals for use in an RF transceiver of an RF presence-sensing arrangement. The receiver for RF sensing signals according to the third aspect comprises an RF signal receiving unit which is configured to receive from a first transmitter a wireless first intra-network RF sensing signal transmitted within a first local-area RF communication network spanning a first presence-sensing volume. The RF signal receiving unit is further configured to receive from a second transmitter that belongs to a second local-area RF communication network, which is different from the first local-area RF communication network and which spans a second presence-sensing volume different from the first presence-sensing volume, an inter-network RF sensing signal, thus spanning a third presence-sensing volume bridging space between the first presence-sensing volume and the second presence-sensing volume. The receiver further comprises a signal-strength determination unit which is configured to determine a first amount of a quantity indicative of a received-signal strength of the received first intra-network RF sensing signal and to provide a first signal-strength signal indicative thereof. Additionally, the signal-strength determination unit is configured to determine a second amount of the quantity indicative of a received-signal strength of the received inter-network RF sensing signal and to provide an inter-network signal-strength signal indicative thereof.

The receiver of the third aspect of the present invention provides receiver functionality required for an RF transceiver for implementing an RF presence-sensing arrangement according to the first aspect of the present invention. As such, the receiver in particular forms a component suitable for incorporation in an RF transceiver of the second aspect. The receiver for RF sensing signals has an RF signal receiving unit, which is not only capable of receiving and processing intra-network RF sensing signals received from one or more first RF transceivers within the first local-area RF communication network to which the RF transceiver belongs. Additionally, the RF signal receiving unit is also capable of receiving and processing the inter-network RF signals provided by one or more second RF transceivers, which do not form a part the first local-area RF communication network defining the first presence-sensing volume, but form a part of a second local-area RF communication network defining a second presence-sensing volume.

The receiver of the third aspect of the invention shares the advantages achieved by the RF transceiver of the second aspect and by the RF presence-sensing arrangement of the first aspect.

In the following, embodiments of the RF presence-sensing arrangement, of the RF transceiver and of the receiver of the above-described device aspects of the present invention will be described. For reasons of economy of description, the embodiments will be described in the context of the particular device aspect only. However, it should be understood that all the embodiments described in the following generally apply to all three device aspects, and thus at the same time relate to corresponding embodiments of the other device aspects not mentioned in the particular context.

The first and the second local-area RF communication networks are each formed by a respective collection of RF nodes in which communication links, in this case RF communication links, are set up so as to enable payload data transmission between the RF nodes within the given local-area RF communication network.

As is per se known, the RF communication links between RF nodes belonging to the same local-area RF communication network also enable a presence-sensing capability between these RF nodes. The RF nodes, which are suitable for presence-sensing purposes are herein sometimes also referred to also as sensing nodes. They can generally be implemented in different ways, depending on their communication capabilities, such as individual RF receivers, individual RF transmitters, or, preferably, as RF transceivers, i.e., sensing nodes configured to transmit and receive the RF sensing signals mentioned herein.

Preferred embodiments of the RF presence-sensing arrangement of the first aspect of the invention advantageously comprise at least one RF transceiver of the second aspect of the present invention.

Preferred embodiments of the RF presence-sensing arrangement of the first aspect of the invention comprise at least one RF transceiver with a receiver according to the third aspect.

Preferred embodiments of the RF transceiver of the second aspect of the invention thus advantageously comprise a receiver according to the third aspect.

In the following, embodiments of the receiver of the third aspect of the invention will be described, occasionally accompanied by implementation examples forming embodiments of the other device aspects.

In some embodiments, the first and second local-area RF communication networks use different wireless communication protocols in the context of their respective intra-network RF sensing.

In other embodiments, the different local-area RF communication networks use an identical wireless communication protocol for their respective intra-network RF sensing.

However, in this case, to distinguish intra-network RF communication from inter-network RF communication, each of the local-area RF communication networks has a different network identifier, such as, for instance, a service set identifier (SSID) associated to a 802.11 wireless local area network. Other types of network identifiers may be used in the context of other communication protocols.

For instance, thus, in a particular embodiment, the RF signal receiving unit of the receiver of the first aspect is configured to receive and process the first intra-network RF sensing signal and the inter-network RF sensing signal using an identical wireless communication protocol. Exemplary embodiments communicate in accordance with alternative wireless communication protocols such as WiFi, Bluetooth, Low Energy Bluetooth (BLE), Z-Wave, 6LoWPAN, Thread, or another known suitable wireless communication protocol.

In preferred embodiments, the wireless communication protocol is an IEEE 802.15.4 based wireless communication protocol, for instance ZigBee.

Different embodiments make use of different implementations for the signal exchange, and in particular use different ways of channelization to receive the intra-network RF sensing signals and the internetwork RF sensing signals. By way of an example, implementation in an embodiment of an RF presence-sensing arrangement, a first local-area RF communication network and the second local-area RF communication network are implemented and use the different signal frequencies for presence-sensing within their respective local-area RF communication network. However, at least one RF transceiver of the second local-area RF communication network provides the inter-network RF sensing signals for reception by at least one RF transceiver of the first local-area RF communication network using the same signal frequency as used in the first local-area RF communication network. In one particular example, a channelization for distinguishing the inter-network RF sensing signals is achieved using a time-division scheme for the transmission and reception of the two kinds of RF sensing signals. In particular, the receiver of the third aspect in an RF transceiver of the first local-area RF communication network is in this variant configured to receive the first intra-network RF sensing signal at predetermined first time slots and to receive the inter-network RF sensing signal at predetermined second time slots, different from and non-overlapping with the first time slots. Other ways of channelization can be used.

In alternative embodiments implementing other schemes for the exchange of RF sensing signals, the RF signal receiving unit of the receiver of the first aspect is configured to receive the inter-network RF sensing and the first intra-network RF sensing signal via respective different communication channels defined by the wireless communication protocol.

A configuration according to IEEE 802.15.4 based wireless communication protocols is also suitable. Some of these protocols require use of a PAN (Personal Area Network) identifier which is a 16-bit identifier. It is used by the MAC (Media Access Control) layer of the protocol stack, for instance to filter out received packets that are not part of the same local-area RF communication network but are exchanged using the same wireless communication protocol, such as ZigBee. In one embodiment, in which the wireless communication protocol is an IEEE 802.15.4 based wireless communication protocol, the receiver of the third aspect is configured to receive and process the inter-network RF sensing signals according to an Inter-PAN transfer under the protocol. Inter PAN transfer refers to a situation where a message is sent to a network node in a different PAN with a different PAN ID. In the present embodiment, the inter-network RF sensing signals are sent as a part of such an Inter-PAN message. Advantageously, in this particular embodiment, the RF transceiver of the second local-area RF communication network provides the inter-network RF sensing signal.

In an alternative embodiment, the RF signal receiving unit of the receiver of the third aspect is configured to receive the first intra-network RF sensing signal according to a first wireless communication protocol and to receive the inter-network RF sensing signals according to a second wireless communication protocol different from the first communication protocol. This receiver embodiment advantageously reduces RF interferences between the first and the second local-area RF communication networks. As a non-limiting example, in one such embodiment, the first and the second wireless communication protocols are a IEEE 802.15.4 communication protocol and a IEEE 802.15.1 communication protocol, respectively. In another embodiment of this kind, the first and second intra-network RF sensing signals are exchanged according to a ZigBee communication protocol and the inter-network RF sensing signals are exchanged according to a BLE communication protocol. Other alternative wireless communication protocols that can be used for exchanging payload data within the first and the second local-area RF communication network include, but are not limited to, WiFi, Bluetooth, Low Energy Bluetooth (BLE), Z-Wave, 6LoWPAN and Thread.

In an embodiment of the RF transceiver of the second aspect, the RF transceiver is configured to additionally join the second local-area RF communication network and to receive from the second transmitter that belongs to the second local-area RF communication network, second intra-network RF sensing signals within the second local-area RF communication network as the wireless inter-network RF sensing signals. Thus, with respect to the corresponding embodiment of the RF presence-sensing arrangement, at least one RF transceiver of the first set forming part of the first local-area RF communication network is configured to operate in both, the first and the second local-area RF communication networks, thus spanning the third sensing volume. In terms of spatial arrangement, however, such RF transceivers are preferably arranged to contribute to the first sensing volume and to the third sensing volume, but not to the second sensing volume.

In the following, further embodiments of the RF presence-sensing arrangement of the first aspect will be described.

Different embodiments implement different ways of determining presence using the determined first signal-strength signal and the inter-network signal-strength signal. In one embodiment, the presence detection unit is configured to compare the respective signal strengths provided therein with predetermined reference signal-strength information in the form of a respective threshold value indicative of a received-signal strength indication value expected when no object or subject is present in the respective presence-sensing volume. In a variant, additional threshold values are pre-stored for allowing a comparison with the expected received-signal strength indication values for different predetermined numbers of subjects in the respective presence-sensing volume. This way, a change in number of people present in the respective presence-sensing volume can be determined.

In a further embodiment of the RF presence-sensing arrangement, the presence detection unit is a stand-alone device, which in one variant of this embodiment is associated with the first local-area RF communication network to form a further network node of the first local-area RF communication network. In another variant the presence detection unit is not in association with any of the local-area RF communication networks, but part of a superordinate local area network (LAN) or wide area network (WAN), with which the first and second local-area RF communication networks communicate using a respective gateway device.

In yet another alternative embodiment, the presence detection unit is an integral part of an RF transceiver of the first set of RF transceivers. With regard to the corresponding embodiment of the RF transceiver of the second aspect, this RF transceiver embodiment therefore additionally comprises at least one presence detection unit, which is preferably configured to generate and provide, using the first signal-strength signal and the inter-network signal-strength signal, a presence detection signal indicative of presence or absence of a subject or object in the first or in the third presence-sensing volume.

For intra-network presence sensing within the second local-area RF communication network, a further embodiment of the RF presence-sensing arrangement of the third aspect has at least one RF transceiver of the second set, which is configured to determine an amount of a quantity indicative of a received-signal strength of a received second intra-network RF sensing signal and to provide a second signal-strength signal indicative thereof. Suitably, in such an embodiment, the presence detection unit is further configured to receive the second signal-strength signal and use it to determine presence or absence of a subject or object in the second presence-sensing volume. In an alternative embodiment, the second local-area RF communication network comprises a dedicated second presence detection unit to perform this task.

In another embodiment, at least one RF transceiver of the second set is configured to additionally receive an inter-network RF sensing signal from an external RF transceiver pertaining to an external local-area RF communication network, different than the second local-area RF communication network, to determine an amount of a quantity indicative of a received-signal strength of the received inter-network RF sensing signal and to provide a corresponding signal-strength signal indicative thereof. The external local-area RF communication network is, in an embodiment, the first local-area RF communication network. Alternatively, or additionally, the external local-area RF communication network is, in another embodiment, a network different than the first and the second local-area RF communication network. This way, the overall sensing volume can be further expanded.

In another embodiment, the RF transceivers of the first set are arranged on one floor level of a building and the RF transceivers of the second set are arranged on another, neighboring floor level of the building. In particular, the RF transceivers of a given local-area RF communication network are arranged on only one given floor level, and for example in a ceiling construction of the respective floor level. Thus, in such a RF presence-sensing arrangement, each floor level has a respective local-area RF communication network, and the third sensing volume spans the space extending vertically between the two floors. In principle, placing the RF transceivers of the first set on a single plane, for instance in a ceiling of a building floor, leads to the object or subject to be detected, which is typically standing of a floor of said building floor, presenting a significantly smaller target for the detection. This is especially true in the case of high ceiling heights. This means that the probability of false negatives due to interactions not being significant enough or due to an increase of blind spots in the respective presence-sensing volume increases, when detection is based solely on the first signal-strength signal. However, by placing the RF transceivers of the second set at a ceiling on another, next neighboring building floor in the building, and enabling the transmission and reception of the inter-network RF sensing signals, the accuracy of detection of the object or subject on the building floor in between is increased, since the third detection volume provides an extra presence-sensing volume, where detection based on the first signal-strength signal alone is less accurate or even not possible.

It is particularly advantageous to arrange RF transceivers of the different local-area RF communication networks at corresponding or nearly corresponding lateral positions, so as to establish an at least approximately vertical line of sight in the communication of the inter-network RF sensing signals, which corresponds to the shortest distance between RF transceivers arranged at identical lateral positions but on different floors.

In another embodiment, the RF transceivers of two different local-area RF communication network are arranged at different sides of a firewall or other highly-absorbing but not fully shielding wall, in terms of RF signals. In another embodiment, the RF transceivers of one of the different local-area RF communication networks are arranged inside an elevator shaft.

In an embodiment of the RF presence-sensing arrangement, the RF transceivers of the first and the second set of RF transceivers are included in a respective lighting device. This is particularly advantageous in embodiments wherein the first and the second set of RF transceivers are arranged in a respective ceiling of a respective building floor. Suitably, the intra-network RF sensing signals can be provided in the form of, or as signal components of, RF operation control signals exchanged between the RF transceivers of a given local-area RF communication network for control of operation of the lighting devices using payload data exchanged within the local-area RF communication network.

In a preferred embodiment, the RF transceivers of the first set are included in a respective troffer fixture, and the RF transceivers of the second set are included in a respective downlight fixture. Downlight fixtures typically leverage a wireless driver which is at the top of the downlight fixture that is arranged facing downwards towards a plenum. Metal cans of downlight fixtures can obstruct a wireless downward path. Thus, downlight fixtures are preferably assigned to the lower of the two building floors, wherein troffer fixtures are preferably assigned to the higher of the two building floors.

In another embodiment of the RF presence-sensing arrangement, also the RF transceivers of the second set of RF transceivers are configured to receive the inter-network RF sensing signals which are provided by RF transceivers pertaining to a further local-area RF communication network different from the second local-area RF communication network. In one variant of this embodiment, this further local-area RF communication network is the first local-area RF communication network. In other, preferred embodiments, the further local-area RF communication network is different from the first and the second local-area RF communication networks.

The following description turns to the method and computer program aspects of the present invention.

According to a fourth aspect of the present invention, a method for operating a receiver is disclosed. The method comprises:
- receiving, from a first transmitter, a wireless first intra-network RF sensing signal transmitted within a first local-area RF communication network;
- determining an amount of a quantity indicative of a received-signal strength of the received first intra-network RF sensing signal;
- providing a first signal-strength signal indicative thereof;
- receiving from a second RF transceiver that belongs to a second local-area RF communication network different than the first local-area RF communication network, an inter-network RF sensing signal;
- determining an amount of a quantity indicative of a received-signal strength of the received inter-network RF sensing signal; and
- providing an inter-network signal-strength signal indicative thereof.

The method of the third aspect thus shares the advantages of the receiver of the first aspect or of any of its embodiments.

Analogously, the method of the fourth aspect can be implemented to operate an RF transceiver according to the second aspect of the invention.

Also, according to a fifth aspect, a method for operating RF presence-sensing arrangement which comprises a first set of RF transceivers forming a first local-area RF communication network spanning a first presence-sensing volume and a second set of RF transceivers forming a second local-area RF communication network spanning a second presence-sensing volume separated from the first presence-sensing volume by a sensing gap is described. The method comprises:
- performing the steps of the method of the third aspect;
- comparing the signal strengths provided by the first and the inter-network signal-strength signals with predetermined respective reference signal-strength information;
- providing, based on the comparisons, a presence detection signal indicative of a change in presence of a subject or object in the first or third presence-sensing volume.

According to a sixth and a seventh aspect of the invention, respective computer programs are presented. The computer programs comprise instructions which, when the programs are executed by a computer, cause the computer to carry out the steps of the method of the third and fourth aspect respectively.

It shall be understood that the receiver of claim 1, the RF transceiver of claim 7, the RF presence-sensing arrangement of claim 8, the method for operating a receiver of claim 12, the method for operating an RF presence-sensing arrangement of claim 13 and the computer programs of claims 14 and 15 have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
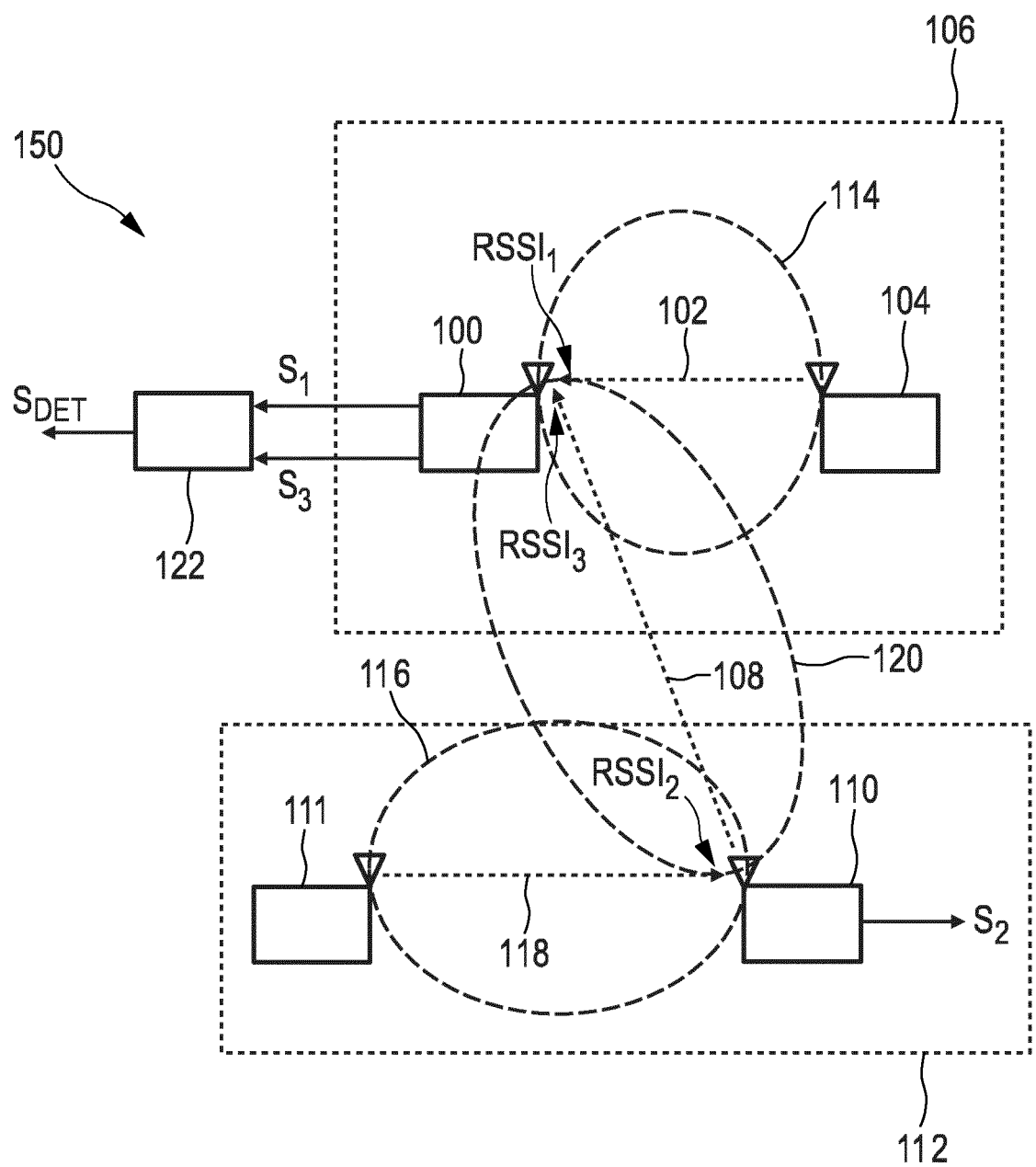
FIG. 1 shows a schematic representation of an embodiment of an RF presence-sensing arrangement.

FIG. 1 shows a schematic representation of an embodiment of an RF presence-sensing arrangement 150. The RF presence-sensing arrangement 150 comprises a first set of RF transceivers 100, 104 that form a first local-area RF communication network 106 that spans a first presence-sensing volume 114. The RF transceiver 100 of the first set is configured to receive a first intra-network RF sensing signal 102 from a first transmitter 104. Both RF transceivers 100 and 104 belong to the first local-area RF communication network 106. The RF transceiver 100 is also configured to determine an amount of a quantity indicative of a received-signal strength $RSSI_1$ of the received first intra-network RF sensing signal and to provide a first signal-strength signal $S_1$ indicative thereof.

Further, RF transceiver 100 is configured to additionally receive an inter-network RF sensing signal 108 from an external RF transceiver 110 pertaining to a second local-area RF communication network 112. The second local-area RF communication network 112 is different from the first local-area RF communication network 106. The RF transceiver 100 is also configured to determine an amount of a quantity indicative of a received-signal strength of the received inter-network RF sensing signal ($SSI_3$, and to provide an inter-network signal-strength signal $S_3$ indicative thereof.

The RF presence-sensing arrangement 150 also comprises a second set of RF transceivers 110,111 that form the second local-area RF communication network 112 which spans a second presence-sensing volume 116 separated from the first presence-sensing volume 114 by a sensing gap. Each RF transceiver of the second set is configured to transmit and receive second intra-network RF sensing signals 118 within the second local-area RF communication network 112, to determine an amount of a quantity indicative of a received-signal strength $RSSI_2$ of a received second intra-network RF sensing signal and to provide a second signal-strength signal $S_2$ indicative thereof.

Additionally, the RF transceivers of the first set are configured to receive an inter-network RF sensing signal 108 from at least one RF transceiver 110 of the second set, thus spanning a third presence-sensing volume 120 that bridges the first presence-sensing volume 114 and the second presence-sensing volume 116, to determine an amount of a quantity indicative of a received-signal strength $RSSI_3$ of the received inter-network RF sensing signal and to provide an inter-network signal-strength signal $S_3$ indicative thereof.

The RF presence-sensing arrangement further comprises at least one presence detection unit 122 configured to receive the first and the inter-network signal-strength signals, to compare the respective signal strengths provided therein with predetermined reference signal-strength information and, based thereon, to provide a presence detection signal STET indicative of a change in presence of a subject or object in the first or in the third presence-sensing volume.

The RF presence-sensing arrangement of the present invention allows placing the RF transceivers of the first and second local-area RF communication networks on a respective single plane, in particular in the ceiling, looking top-down for instance. In principle, considering the RF intra-network sensing signals alone, this arrangement leads to the human body presenting a rather small target, especially for higher ceiling heights, in comparison with placing RF transceivers at chest height on walls of a room. For, as explained before, the bulk of the detection sensitivity is mainly within the direct line of sight of the RF transceivers of a given local-area RF communication network. The RF presence-sensing arrangement of the present invention compensates for the such disadvantageous sensing characteristics in a local-area RF communication network having such a spatial arrangement of its RF transceivers. It achieves a bridging of space or volume between the first and second presence-sensing volumes, by providing RF inter-network sensing between the local-area RF communication networks of the RF presence-sensing arrangement for establishing a third presence-sensing volume in this space. This way, providing a larger number of RF transceiver within a given local-area RF communication network can be avoided.

Figure 2:
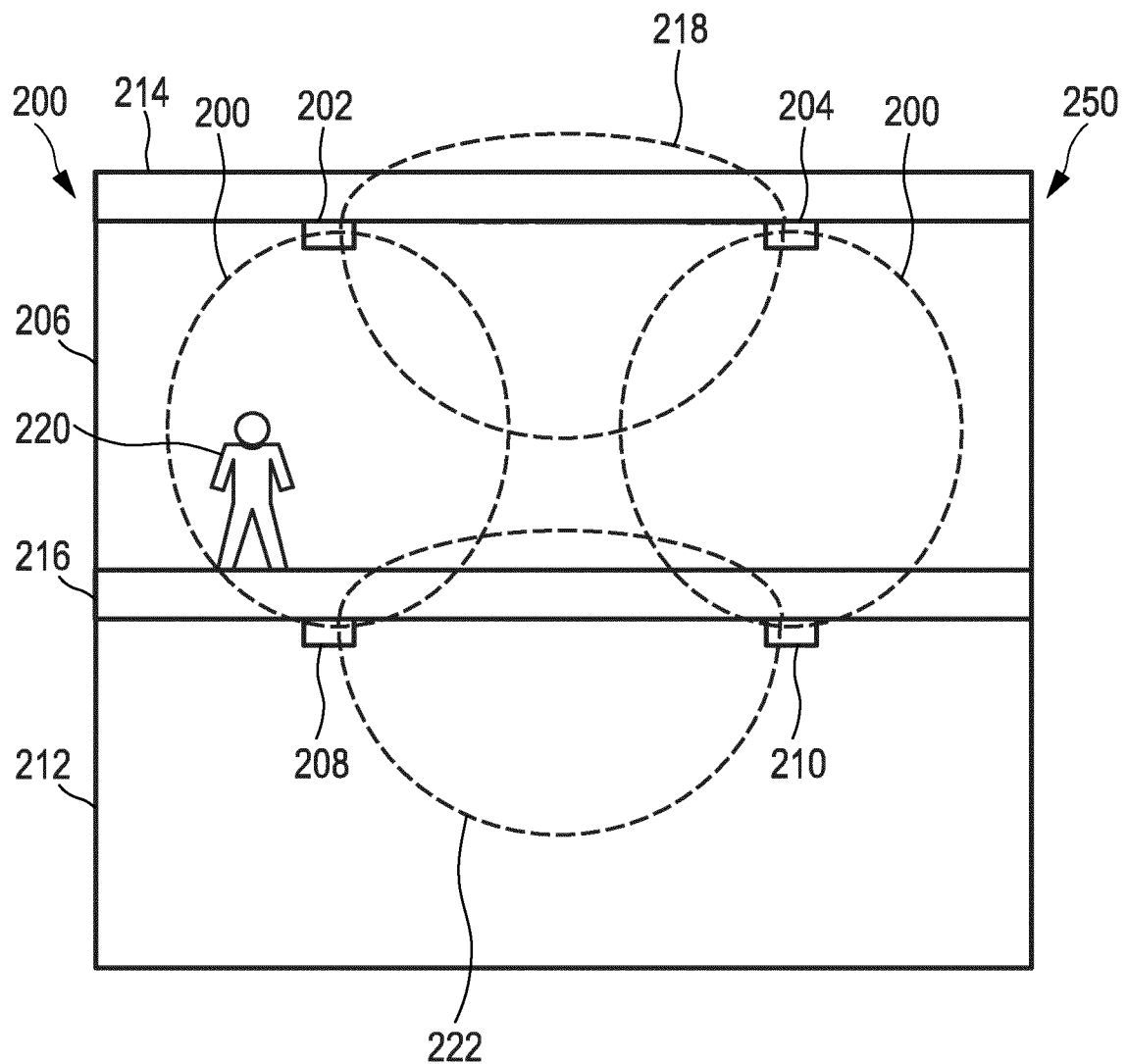
FIG. 2 shows a schematic representation of another embodiment of an RF presence-sensing arrangement.

FIG. 2 shows a schematic representation of another embodiment of an RF presence-sensing arrangement, wherein the RF transceivers of the first set 202, 204 are arranged on one building floor 206 in a building 250 and the RF transceivers of the second set 208, 210 are arranged on another, next lower building floor 212 in the building 250. In particular, the RF transceivers of the first set 202, 204 are arranged at a ceiling 214 of building floor 206 and the RF transceivers of the second set 208, 218 are arranged at a ceiling 216 of building floor 212.

In a particularly advantageous RF presence-sensing arrangement, the RF transceivers of the first and the second set of RF transceivers are integrated into respective lighting devices. More preferably, the lighting devices can be wirelessly controlled using the respective first and second local-area RF communication networks by exchanging payload data within the respective local-area RF communication network.

As an example, the building 250 is fitted with RF sensing via their ceiling luminaires, which comprise RF transceivers configured to exchange RF sensing signals in accordance with a predetermined wireless communication protocol. The RF transceivers of the first set of RF transceivers are arranged at the ceiling 214 of building floor 206 and form a first local-area RF communication network spanning a first presence-sensing volume 218. The RF transceivers 202 and 204 are configured to transmit and receive first intra-network RF sensing signals within the first local-area RF communication network, to determine an amount of a quantity indicative of a received-signal strength of a received first intra-network RF sensing signal and to provide a first signal-strength signal indicative thereof. Based on the RSSI value of the first intra-network RF sensing signals, a presence of an object or subject 220 in the building floor 206 can be determined if the object or subject enters the first presence-sensing volume.

Accordingly, the RF transceivers 208 and 210, which belong to the second set of RF transceivers and are arranged at the ceiling 216 of building floor 212, form a second local-area RF communication network spanning a second presence-sensing volume 222. The RF transceivers 208 and 210 are configured to transmit and receive second intra-network RF sensing signals within the second local-area RF communication network, to determine an amount of a quantity indicative of a received-signal strength of a received second intra-network RF sensing signal and to provide a second signal-strength signal indicative thereof.

Based on the RSSI value of the second intra-network RF sensing signals, a presence of an object or subject in floor 212 can be determined if the object or subject enters the second presence-sensing volume 222.

In order to determine the presence of the subject 220 in the building floor 206 with more accuracy, the RF transceivers 202 and 204 are additionally configured to receive an inter-network RF sensing signal from an RF transceiver 208, 210 pertaining to the second local-area RF communication network, to determine an amount of a quantity indicative of a received-signal strength of the received inter-network RF sensing signal and to provide an inter-network signal-strength signal indicative thereof. This is particularly advantageous in case where it is not possible or feasible to add further RF transceivers to the first local-area RF communication network that would lead to an increase of the accuracy of the presence determination.

In the exemplary presence sensing arrangement described above with reference to FIG. 2, the accuracy of the presence determination in the building floor 206 is enhanced by having the RF transceivers 202 and 204 in said floor make an additional sensing link with the respective RF transceivers 208 and 210 lights in building floor 212, which are placed at roughly the same spots with respect to those RF transceivers 202, 204 in building floor 206. Thus, the RF transceivers 202 and 204 are capable of combining information from their own floor, plus use the vertical space between them and the corresponding RF transceiver 208 and 210 in building floor 212 as an additional third presence-sensing volume, therefore solving the problem of the single plane detection area.

In this particular example, wherein each RF transceiver 202, 204 of the first local-area RF communication network receives the inter-network RF sensing signal from a respective one of the RF transceivers 208, 210 of the second local-area RF communication network there is little overhead and additional network traffic when compared to the native state per floor, i.e. sensing limited within the respective local-area RF communication network.

The number of RF transceiver in the example of FIG. 2 is limited to two per local-area RF communication network for the sake of clarity and conciseness. However, there are RF presence-sensing arrangements wherein the number of RF transceivers in each local-area RF communication network is larger than two. Additionally, or alternatively each RF transceiver on the higher building floor can establish sensing links with more than one, or even all of the RF transceivers installed on the lower building floor. This leads to an increase in the coverage area in case more fine-grained presence detections are needed, at the expense of extra traffic in the local-area RF communication networks. The extra networking traffic can be resolved by placing extra gateways in the local-area RF communication network.

This usage of RF transceivers of two consecutive building floors leads to a certain asymmetry, as e.g. the RF transceivers on the lower floor might not have a counterpart in the floor below it to sense with respect to them. However, the RF transceivers in the lower floor may use the information gathered by the sensing cross-links provided by the internetwork RF sensing signals between the local-area RF communication networks in the higher and the lower floors to properly discriminate whether a detection picked up by just the nodes on the lower floor is due to the subject present there, or is it due to unwanted interference of the subject being present on the higher floor. In this way the RF transceivers of the local-area RF communication network of the lower floor do also benefit partially from the inter-network RF sensing. For instance, and as a non-limiting example, if a shared use building has on the first floor an office and on the second floor a data center, the RF-based RF presence-sensing arrangement would be chosen to ensure maximum presence detection reliability for the second floor housing the data center, and hence, for instance, allowing accurate sensing for intruders.

In another exemplary RF presence-sensing arrangement (not shown) implemented in a building with intermediate floors, the RF transceiver of the intermediate floors participate in multiple inter-floor RF sensing schemes. For example, if a building has three floors, each comprising a respective local-area RF communication network spanning a respective presence-sensing volume, the RF transceivers in the second floor are configured to participate in inter-floor RF sensing schemes with those RF transceivers of the first and of the third floor. In this particular example, the main improvement in terms of detection quality for the RF transceivers in the second floor would come from their interaction with those of the first floor, plus some discriminating information from their interaction with those RF transceivers in the third floor. In some cases, such as with RF transceivers featuring powerful Wi-Fi radios penetrating two ceilings, the nodes on the first floor may contribute to RF based sensing on the third floor of the building.

In another exemplary presence sensing arrangement, the location, quantity, or density of RF transceivers on each local-area RF communication network might not be the same with respect to each other; i.e. there's not a consistent placement of RF transceivers across floors when looking at it from a transversal view. As a result, not all RF transceivers might have the same counterpart links. This situation is solved in a particular presence sensing arrangement by filtering the inter-network RF sensing signals based on distances between the RF transceivers of the first local-area RF communication network and those of the second local-area RF communication network to avoid relying on inter-network RF sensing signals provided by RF transceivers which are simply too far away.

In another RF presence-sensing arrangement, the RF transceivers of the first local-area RF communication network are further configured to choose which counterparts to interact with, depending on e.g. the RSSI value of the inter-network sensing signals it receives from RF transceivers of the second local-area RF communication network, regardless of where their position relative to each other. This is advantageous since it leads to avoiding an evaluation of RF sensing links, i.e. inter-network RF sensing signals, in cases where there is, for instance, large furniture like cabinets between the respective RF transceivers. The presence of large furniture not only reduces signal to noise ratio but also, from an application perspective, these positions are unlikely to be occupied by people. It also leads to avoiding an evaluation of RF sensing links in areas where occupancy detection has less value, such as for instance a busy corridor where the lights are always on and hence no latency and no highly reliable presence detection is required. Similarly, spots which over time show large fluctuations of RSSI should be favored, as this could be an indication of areas which users are occupying regularly, such as e.g. desks.

In another presence sensing arrangement, and in order to limit network traffic and unreachability of some RF transceivers, the RF presence-sensing arrangement is configured to select to use for inter-floor RF sensing those RF transceivers which are not being used within each floor, or those which are used less. This ensures that the overall traffic is properly evened out.

RF-based sensing is difficult for high-ceiling heights due to a too long wireless path/distance from a ceiling luminaire comprising the RF transceiver, to the ground where the subject to be detected is located and back up to the other ceiling luminaire. For instances in warehouses, a ceiling height of 15 m and above is usual. For multi-story warehouse buildings is may hence be advantageous to leverage wireless lighting nodes in the ceiling from the second floor and the first floor. Further, emergency lights or digital signage at multiple wall heights within the floor, which may be leveraged for connecting to the floor underneath, can be used.

In typical RF presence-sensing arrangement (not shown), using a predetermined wireless communication protocol for exchanging the respective intra-network RF sensing signals, the RF transceivers in each local-area RF communication network are commissioned to use different channels (e.g. ZigBee channels) to avoid radio interference between the building floors. However, it is desirable to have the RF transceivers installed in different building floors sharing the same ZigBee channel, but not necessarily the same ZigBee local-area RF communication network, in order for the RF transceivers at different floors being able to listen to each other's messages, i.e. the inter-network RF sensing signals, and determine the RSSI thereof.

Another exemplary presence sensing arrangement is used to perform RF-based sensing on walkways between buildings. It is known that ZigBee lighting installations suffer from wireless interference penetrating through the window from neighboring buildings. Thus, lighting fixtures housed on buildings on both sides of the walkway are leveraged. In addition to presence sensing, this highly spatially distributed presence sensing arrangement is also able to count and track people without the need for a camera.

Figure 3:
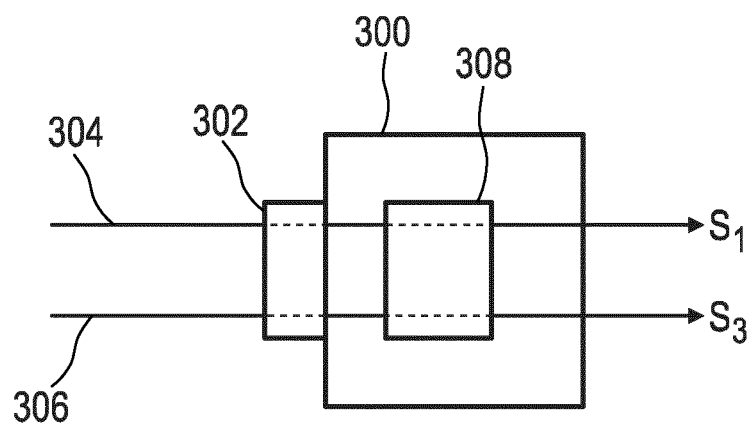
FIG. 3 shows a schematic block diagram of an embodiment of a receiver.

FIG. 3 shows a schematic block diagram of a receiver 300 that can be implemented in any of the RF transceivers described above. The receiver comprises an RF signal receiving unit 302 which is configured to receive a first intra-network RF sensing signal 304 from a first transmitter pertaining to a first local-area RF communication network. The RF signal receiving unit 302 is also configured to additionally receive an inter-network RF sensing signal 306 from a second transmitter pertaining to a second local-area RF communication network, different than the first local-area RF communication network. The receiver comprises a signal-strength determination unit 308 that is configured to determine an amount of a quantity indicative of a received-signal strength of the received first intra-network RF sensing signal to provide a first signal-strength signal $S_1$ indicative thereof. The signal strength determination unit 308 is also configured to determine an amount of a quantity indicative of a received-signal strength of the received inter-network RF sensing signal and to provide an inter-network signal-strength signal $S_3$ indicative thereof.

Figure 4:
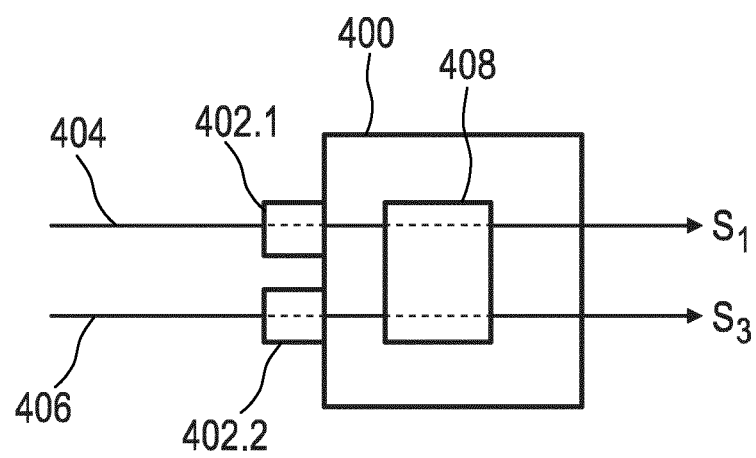
FIG. 4 shows a schematic block diagram of another embodiment of a receiver.

FIG. 4 shows a schematic block diagram of another receiver 400 that can be implemented in any of the RF transceivers described above. The receiver 400 is configured to receive the first intra-network RF sensing signal 404 according to a first wireless communication protocol and to receive the inter-network RF sensing signal 406 according to a second wireless communication protocol different than the first communication protocol. The RF signal receiving unit comprises two sub-units, 402.1 and 402.2, each configured to receive a respective one of the first intra-network RF sensing signal 404 and the inter-network RF sensing signal 406. The receiver 400 also comprises a signal-strength determination unit 408 that is configured to determine an amount of a quantity indicative of a received-signal strength of the received first intra-network RF sensing signal 404 and to provide a first signal-strength signal $S_1$ indicative thereof. The signal strength determination unit 408 is also configured to determine an amount of a quantity indicative of a received-signal strength of the received inter-network RF sensing signal 406 and to provide an inter-network signal-strength signal $S_3$ indicative thereof.

Figure 5:
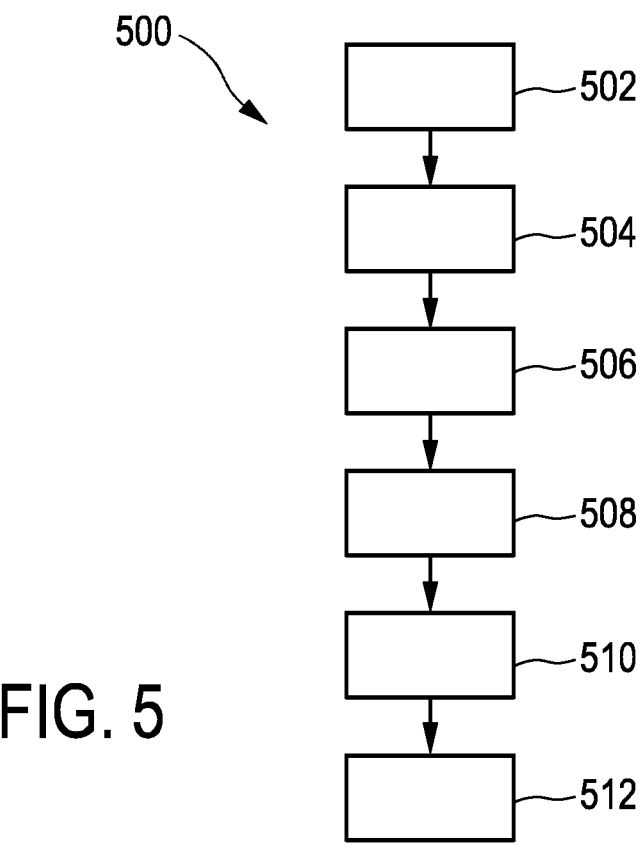
FIG. 5 shows a flow diagram of an embodiment of a method for operating a receiver.

FIG. 5 shows a flow diagram of an embodiment of a method 500 for operating a receiver. The method comprises, in a step 502, receiving from a first transmitter, a wireless first intra-network RF sensing signal transmitted within a first local-area RF communication network. The method also comprises, in a step 504, determining an amount of a quantity indicative of a received-signal strength of the received first intra-network RF sensing signal. Further, the method comprises, in a step 506, providing a first signal-strength signal indicative thereof. The method also comprises, in a step 508, receiving from a second RF transceiver that belongs to a second local-area RF communication network, different than the first local-area RF communication network, an inter-network RF sensing signal. The method includes, in a step 510, determining an amount of a quantity indicative of a received-signal strength of the received inter-network RF sensing signal, and in a step 512, providing an inter-network signal-strength signal indicative thereof.

Steps 508, 510 and 512 can be performed in that order before steps 502, 504 and 506. Thus, it is not necessary to provide the inter-network signal-strength signal after providing the first signal-strength signal.

Figure 6:
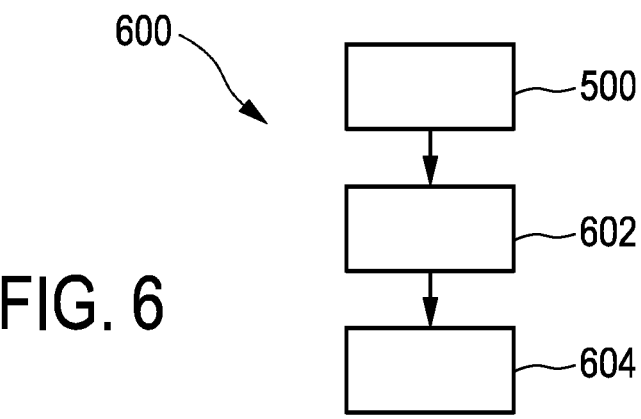
FIG. 6 shows a flow diagram of an embodiment of a method for operating an RF presence-sensing arrangement.

FIG. 6 shows a flow diagram of an embodiment of a method 600 for operating an RF presence-sensing arrangement which comprises a first set of RF transceivers forming part of a first local-area RF communication network spanning a first presence-sensing volume and a second set of RF transceivers forming part of a second local-area RF communication network spanning a second presence-sensing volume separated from the first presence-sensing volume by a sensing gap is described. The method comprises performing the steps of the method 500. Further, the method comprises, in a step 602, comparing the signal strengths provided by the first and the inter-network signal-strength signals with predetermined respective reference signal-strength information. Finally, the method includes, in a step 604, providing, based on the comparisons, a presence detection signal indicative of a change in presence of a subject or object in the first or third presence-sensing volume.

In summary, the invention is directed to a receiver for an RF presence-sensing arrangement. The receiver is configured to receive a first intra-network RF sensing signal from a first transmitter, both pertaining to a first local-area RF communication network spanning a first presence-sensing volume and to additionally receive an inter-network RF sensing signal from a second transmitter pertaining to a second local-area RF communication network, thereby spanning a third presence-sensing volume and to provide a first and an inter-network signal-strength signal indicative of a respective received-signal strength. In the RF presence-sensing arrangement, a presence detection unit is configured to provide, based on the signal-strength signals, a presence detection signal indicative of a change in presence of a subject or object in the first or in the third presence-sensing volume, thus increasing the accuracy of the presence determination.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A receiver for RF sensing signals, for use in an RF transceiver of an RF presence-sensing arrangement, the receiver comprising:

an RF signal receiving unit configured to receive from a first transmitter a wireless first intra-network RF sensing signal transmitted within a first local-area RF communication network spanning a first presence-sensing volume, to receive from a second transmitter that belongs to a second local-area RF communication network, which is different from the first local-area RF communication network and which spans a second presence-sensing volume different from the first presence-sensing volume, a first inter-network RF sensing signal, and to receive from a third transmitter that also belongs to the second local-area RF communication network, a second inter-network RF sensing signal; and a signal-strength determination unit configured to determine a first amount of a quantity indicative of a received-signal strength of the received first intra-network RF sensing signal and to provide a first signal-strength signal indicative thereof, to determine a second amount of a quantity indicative of a received-signal strength of the received first inter-network RF sensing signal, to determine a third amount of a quantity indicative of a received-signal strength of the received second inter-network RF sensing signal, to choose whether to utilize the second transmitter or the third transmitter as a counterpart to the first transmitter based on comparing fluctuations of the second amount to fluctuations of the third amount, and to provide an inter-network signal-strength signal indicative of either the first amount or the second amount based on comparison, the inter-network signal strength signal responsive to a third presence-sensing volume bridging a space between the first presence-sensing volume and the second presence-sensing volume and defined by the chosen counterpart transmitter, wherein the first transmitter is installed on a floor of a building and the second and third transmitters are installed at different locations on another floor of the building, wherein the first, second, and third transmitters transmit on a same communication channel whereas the respective first and second local-area RF communication networks to which they belong are different;

wherein the RF presence-sensing arrangement includes at least one presence detection unit configured to receive, from the receiver, the first signal-strength signal and the inter-network signal-strength signal and to provide a presence detection signal indicative of presence or absence of a subject or object in either the first presence-sensing volume or in the third presence-sensing volume defined by the chosen counterpart transmitter.

2. The receiver of claim 1, wherein the RF signal receiving unit is configured to receive and process the first intra-network RF sensing signal and the inter-network RF sensing signal according to an identical wireless communication protocol.

3. The receiver of claim 2, wherein the wireless communication protocol is an IEEE 802.15.4 wireless communication protocol, and wherein the receiver is further configured to receive the inter-network RF sensing signals according to an Inter-PAN transfer.

4. The receiver of claim 1, wherein the RF signal receiving unit is further configured to receive the first intra-network RF sensing signal according to a first wireless communication protocol and to receive the inter-network RF sensing signal according to a second wireless communication protocol different from the first wireless communication protocol.

5. An RF transceiver for an RF presence-sensing arrangement, which is configured to exchange first intra-network RF sensing signals as a member of a first local-area RF communication network spanning a first presence-sensing volume and formed by a first set of RF transceivers, wherein the RF transceiver comprises a receiver for RF sensing signals, the receiver being in accordance with claim 1.

6. The RF transceiver of claim 5, which is configured to additionally join the second local-area RF communication network and to receive from the second transmitter that belongs to the second local-area RF communication network second intra-network RF sensing signals within the second local-area RF communication network as the wireless inter-network RF sensing signals.

7. An RF presence-sensing arrangement, comprising
a first set of RF transceivers that belong to a first local-area RF communication network spanning a first presence-sensing volume, wherein the RF transceivers of the first set are configured to transmit and receive first intra-network RF sensing signals within the first local-area RF communication network, the first set including at least one RF transceiver comprising a receiver according to claim 1;
a second set of RF transceivers that belong to a second local-area RF communication network spanning a second presence-sensing volume different from the first presence-sensing volume, wherein the RF transceivers of the second set are configured to transmit and receive second intra-network RF sensing signals within the second local-area RF communication network; wherein
at least one of the RF transceivers of the second set of RF transceivers is further configured to transmit wireless inter-network RF sensing signals for reception by the RF transceiver of the first set thus spanning a third presence-sensing volume bridging space between the first presence-sensing volume and the second presence-sensing volume; the RF presence-sensing arrangement further comprising:
at least one presence detection unit configured to receive, from the receiver, the first signal-strength signal and the inter-network signal-strength signal and, using the first signal-strength signal and the inter-network signal-strength signal, to provide a presence detection signal indicative of presence or absence of a subject or object in the first or in the third presence-sensing volume.

8. The RF presence-sensing arrangement of claim 7, wherein at least one RF transceiver of the second set is configured to determine an amount of a quantity indicative of a received-signal strength of a received second intra-network RF sensing signal ($RSSI_2$) and to provide a second signal-strength signal indicative thereof; and
wherein the presence detection unit is further configured to receive the second signal-strength signal, to compare the signal strengths provided therein with a predetermined reference signal-strength information and, based thereon, to provide the presence detection signal additionally indicative of a change in presence of a subject or object in the second presence-sensing volume.

9. The RF presence-sensing arrangement of claim 7, wherein the RF transceivers of the first set are arranged on one building floor in a building and the RF transceivers of the second set are arranged on a next lower building floor in the building.

10. The RF presence-sensing arrangement of claim 7, wherein the RF transceivers of the first and the second set of RF transceivers are included in respective lighting devices.

11. The RF presence-sensing arrangement of claim 10, wherein at least one of the lighting devices comprises a troffer fixture.

12. A method for operating a receiver according to claim 1, the method comprising
receiving, from a first transmitter, a wireless first intra-network RF sensing signal transmitted within a first local-area RF communication network;
determining an amount of a quantity indicative of a received-signal strength of the received first intra-network RF sensing signal;
providing, to a presence detection unit, a first signal-strength signal indicative thereof;
receiving, from a second RF transceiver that belongs to a second local-area RF communication network different than the first local-area RF communication network, an inter-network RF sensing signal, thereby spanning a third presence-sensing volume;
determining an amount of a quantity indicative of a received-signal strength of the received inter-network RF sensing signal;
providing, to the presence detection unit, an inter-network signal-strength signal indicative thereof; and
wherein the presence detection unit is configured to determine fluctuations of the first signal-strength signal and the inter-network signal-strength signal over time, to compare the fluctuations of the first signal-strength signal to the fluctuations of the inter-network signal-strength signal over time, and to provide a presence detection signal indicative of presence or absence of a subject or object in either the first presence-sensing volume or in the third presence-sensing volume depending on which of the signal-strength signals has the highest fluctuations over time.

13. A method for operating an RF presence-sensing arrangement which comprises a first set of RF transceivers forming a first local-area RF communication network spanning a first presence-sensing volume and a second set of RF transceivers forming a second local-area RF communication network spanning a second presence-sensing volume separated from the first presence-sensing volume by a sensing gap, the method comprising:
- performing the steps of the method of claim 12;
- comparing the signal strengths provided by the first and the inter-network signal-strength signals with predetermined respective reference signal-strength information;
- providing, based on the comparisons, a presence detection signal indicative of a change in presence of a subject or object in the first or the third presence-sensing volume.

14. A non-transitory computer readable medium comprising instructions which, when executed by a computer, cause the computer to carry out the steps of the method of claim 13.

15. The method of claim 13 further comprising filtering the inter-network RF sensing signals based on distances between the RF transceivers of the first local-area RF communication network and those of the second local-area RF communication network.

16. A non-transitory computer readable medium comprising instructions which, when executed by a computer, cause the computer to carry out the steps of the method of claim 12.

17. A method for operating an RF presence-sensing arrangement which comprises a first set of RF transceivers forming a first local-area RF communication network spanning a first presence-sensing volume and a second set of RF transceivers forming a second local-area RF communication network spanning a second presence-sensing volume separated from the first presence-sensing volume by a sensing gap, the method comprising:
- performing the steps of the method of claim 12;
- comparing the signal strengths provided by the first local-area RF communication network and the second local-area RF communication network signal-strength signals with predetermined respective reference signal-strength information;
- choosing, based on the comparison, a presence detection signal indicative of a change in presence of a subject or object in the first or the second presence-sensing volume.

18. A method for operating an RF presence-sensing arrangement which comprises a first set of RF transceivers forming a first local-area RF communication network spanning a first presence-sensing volume and a second set of RF transceivers forming a second local-area RF communication network spanning a second presence-sensing volume separated from the first presence-sensing volume by a sensing gap, the method comprising:
- performing the steps of the method of claim 12;
- storing the signal strengths provided by the first local-area RF communication network and the second local-area RF communication network signal-strength signals;
- calculating a signal strength fluctuation for each of the first local-area RF communication network and the second local-area RF communication network signal-strength signals;
- comparing signal strength fluctuations provided by the first local-area RF communication network to those provided by the second local-area RF communication network signal-strength signals;
- choosing, based on the comparison, a presence detection signal indicative of a change in presence of a subject or object in the first or the second presence-sensing volume with a highest signal strength fluctuation.

19. The receiver of claim 1 configured to filter the inter-network RF sensing signals based on distances between the RF transceivers of the first local-area RF communication network and those of the second local-area RF communication network.

* * * * *